May 17, 1966 A. H. B. WALKER 3,252,051
OVERVOLTAGE PROTECTIVE DEVICE
Filed June 12, 1962
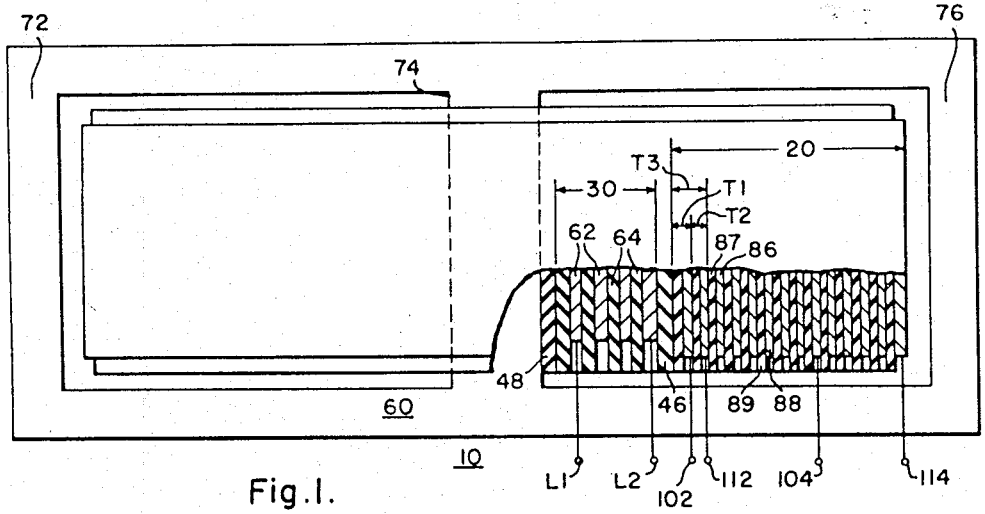
Fig.1.
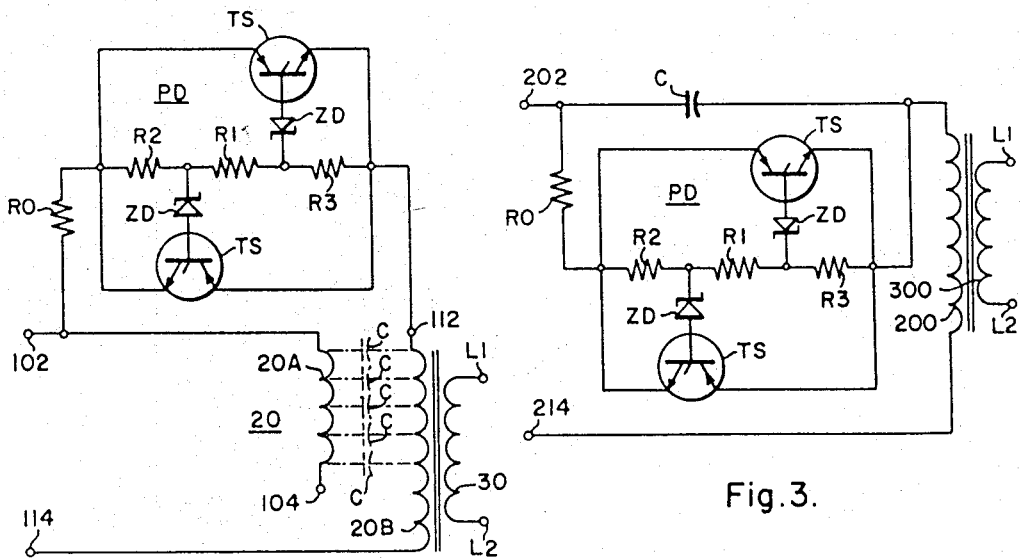
Fig.2.
Fig.3.
WITNESSES
INVENTOR
Alec H. B. Walker
BY
F. E. Browder
ATTORNEY といった
United States Patent Office 3,252,051
Patented May 17, 1966

3,252,051
OVERVOLTAGE PROTECTIVE DEVICE
Alec H. B. Walker, Radlett, England, assignor to Westinghouse Electric Corporation, East Pittsburgh, Pa., a corporation of Pennsylvania
Filed June 12, 1962, Ser. No. 201,960
11 Claims. (Cl. 317—12)

This invention relates, generally, to protective devices and, more particularly, to devices for protecting capacitors against overvoltage.

In order to improve the voltage regulation of a transformer it is desirable to provide the transformer with capacitance either internally between windings of the transformer or externally connected in series with a winding of the transformer. Sufficient capacitance is provided to produce a capacitive reactance voltage or $IX_C$ which will compensate for at least part of the inductive reactance voltage drop or $IX_L$. Since the capacitance, whether internal or external, is in series with a winding of the transformer, sufficient voltage may be developed across the capacitance during fault current conditions to cause serious damage.

An object of this invention is to provide a static device for protecting against overvoltage in electrical apparatus.

A more specific object of the invention is to provide a static switching circuit for by-passing fault currents around a capacitor.

Another object of the invention is to provide a static switching device having self-contained voltage sensing ability.

A further object of the invention is to provide a static switching device which closes quickly upon the occurrence of a fault and opens automatically after the surge resulting from the fault.

Other objects of the invention will be explained fully hereinafter or will be apparent to those skilled in the art.

In accordance with one embodiment of the invention, a protective device, comprising a plurality of resistors, a pair of oppositely poled silicon controlled rectifiers and a pair of Zener diodes are connected across a capacitance which is in series with a transformer winding. Under normal loading conditions the silicon controlled rectifiers are non-conducting, but under fault current conditions the Zener diodes cause the controlled rectifiers to become conductive, thereby establishing a shunt circuit around the capacitance to protect it against overvoltage developed across the capacitance as a result of high current flowing through the capacitance.

For a better understanding of the nature and objects of the invention, reference may be had to the following detailed description, taken in conjunction with the accompanying drawing, in which:

FIGURE 1 is a front elevational view, partly in section and partly schematic, of a transformer core and coil assembly having capacitance between windings of the transformer;

FIG. 2 is a schematic diagram of the transformer with the protective device connected across the capacitance in the transformer, and FIG. 3 is a schematic diagram showing the protective device connected across a capacitor disposed externally of a transformer.

Referring to the drawing and particularly to FIG. 1 the transformer 10 shown therein is of the type described in a copending application of H. W. Book Serial No. 172,916, filed February 13, 1962, now abandoned, and a continuation thereof Serial No. 356,002, filed March 25, 1964, now Patent 3,210,706, and assigned to the same assignee as the present application. The transformer comprises a first or high voltage winding 20 and a second or low voltage winding 30 which are both inductively disposed on a magnetic core structure 60. As illustrated, the magnetic core 60 includes two substantially rectangular windows which are formed by the yoke portions of the magnetic core 60 and the first and second outer leg members 72 and 76, and a middle or winding leg member 74 on which the first and second windings 20 and 30, respectively, are inductively disposed. The winding leg 74 is enclosed or surrounded by a supporting member, more specifically, a tube or barrier member 48 on which the windings 20 and 30 are wound. The tube or barrier member 48 provides mechanical support for the first and second windings 20 and 30 and may be formed from electrically insulating material to insulate said windings from the winding leg member 74 of the magnetic core 60. Although the magnetic core 60 is illustrated as being of the single phase shell form type, it is to be understood that the teachings of the invention may be incorporated in core and coil assemblies including magnetic cores of other types of configurations, such as those of the core form type.

In particular, the first or high voltage winding 20 comprises first and second winding portions or sections 20A and 20B, respectively, as best shown in FIGS. 1 and 2. The first winding section 20A of the winding 20 comprises a plurality of turns of a first layer of conducting sheet material 86 and a second layer of electrically insulating sheet material 87 which are generally spirally wound together about a portion of the magnetic core 60, more specifically the winding leg member 74. Similarly, the second winding section 20B of the winding 20 comprises a plurality of turns of a first layer of conducting sheet material 88 and a second layer of electrically insulating sheet material 89 which are generally spirally wound together about the same portion of the associated magnetic core 60. The widths of the insulating sheet or film materials 87 and 89 are preferably greater than the corresponding widths of the layers of conducting sheet or foil material 86 and 88 in order to provide additional "creep" insulation between the adjacent turns of a first winding 20. The conducting materials 86 and 88 and the insulating materials 87 and 89 are all of a general type in which the axial dimension of the materials is relatively large compared to the radial dimension. In other words, the width of each of the latter materials is relatively large compared to the thickness of each of said materials.

Each turn of the first winding section 20A of the first winding 20, as indicated at T1, includes only a layer of the insulating material 87 and a layer of the conducting material 86, while each turn of the second winding section 20B includes only a layer of the insulating material 89 and a layer of the conducting material 88, as indicated at T2, with each layer of insulating material electrically insulating the adjacent layers of conducting materials from one another to provide the turn-to-turn insulation in the winding 20. It is to be understood, however, that in certain applications a layer of electrically insulating material may be provided on each side of each layer of conducting sheet material which makes up each of the turns of each of the winding sections 20A and 20B of the winding 20 so that each turn of each of the winding sections 20A and 20B would include two layers of electrically insulating material and one layer of conducting sheet material.

As illustrated, the second winding 30 includes a plurality of turns of a layer of conducting sheet or strip material 62 and a layer of electrically insulating sheet material 64 which are generally spirally wound together about the winding leg member 74 of the magnetic core 60. Each turn of the winding 30 includes a layer of the insulating sheet or film material 64 and a layer of the conducting sheet or foil material 62. Similarly to the first winding 20 and for the same reason, the width of the layer of insulating sheet material 64 of the second winding 30 is preferably greater than the width of the layer of conducting sheet material 62 which is included with the turns of each of the winding section 30.

In the assembly of the turns of the windings 20 and 30 the turns of the second winding 30 which includes a layer of insulating sheet material 64 and a layer of conducting sheet material 62 are first wound on the tube or barrier member 48. The inner end or turn of the conducting sheet material 62 of the first winding 30 is connected to the terminal L1. The outer end or turn of the layer of conducting sheet material 62 is connected to the terminal L2. The terminals L1 and L2 may be connected to a load circuit (not shown).

In order to electrically insulate the low voltage winding 30 from the high voltage winding 20, a tubular insulating member 46 is next assembled around the outside of the winding 30. The insulating member 46 may be conveniently formed by lining a plurality of superimposed turns of an insulating sheet material having substantially the same width as the insulating sheet material 64. It is important to note that in a transformer core and coil assembly, such as disclosed, the high voltage winding 20 may be fully insulated from the second or low voltage winding 30 by the insulating member 46 which provides the winding-to-winding insulation.

In the assembly of the winding 20, the turns of the first and second winding sections 20A and 20B are wound simultaneously on a portion of the overall core and coil assembly. Each turn of the combined first and second winding sections 20A and 20B, respectively, of a first winding 20 includes one layer of insulating sheet material 87, one layer of conducting sheet material 86, one layer of insulating sheet material 89 and one layer of conducting sheet material 88, as indicated at T3 in FIG. 1. As described, the turns of the first winding section 20A of the winding 20 are wound simultaneously with at least a portion of the turns of the second winding section 20B of the winding 20 and continuously interleaved with the adjacent turns of the second winding section 20B for a purpose which will be explained hereinafter. The turns of the first winding section 20A, therefore, start and stop at first and second predetermined turns respectively of the second winding section 20B of the first winding 20, the inner end turns of the first and second winding sections 20A and 20B being preferably disposed adjacent to one another for reasons which will be discussed hereinafter.

Considering the connections of the first and second winding sections 20A and 20B as shown in FIGS. 1 and 2, the inner end or turn of the conducting sheet material 86 of the first winding section 20A is connected to a terminal 102, while the outer end or turn of a pair of conducting sheet material 86 of the first winding section 20A is connected to a terminal 104. The inner end or turn of the layer of conducting sheet material 88 of the second winding section 20B is connected to a terminal 112 while the outer end or turn of the layer of conducting material 88 is connected to a terminal 114. It is important to note that the outer end of the conducting sheet material 86 of the first winding section 20A as indicated at the terminal 104 and the inner end or turn of the conducting sheet material 88 of the second winding section 20B as indicated at the terminal 112 are not normally intended or adapted for direct external electrical connection to an alternating current circuit or source (not shown) for reasons which will be discussed hereinafter.

The manner in which the first winding section 20A and the second winding section 20B of the first winding 20 are disposed or arranged with the adjacent turns of the respective winding sections being continuously interleaved has several important results. As best shown in FIG. 2 there is illustrated an equivalent schematic diagram of the first and second windings 20 and 30 of the transformer 10. Because of the insulating and conducting materials employed and the manner in which the turns of the first and second winding sections 20A and 20B are continuously interleaved, a predetermined capacitance of the distributed type, as indicated at C in FIG. 2, results between the adjacent turns of the first and second winding sections 20A and 20B, respectively.

It is important to note that the second winding section 20B of the high voltage winding 20 is adapted to be energized substantially entirely through the first winding section 20A of the winding 20 and the distributed capacitance C since any of those currents flowing from a first alternating current circuit connected at the terminals 102 and 114 would have to flow through a network formed by the combined turns of the first and second winding sections 20A and 20B, respectively, of the first winding 20 and the distributed capacitance C. The current through the distributed capacitance C varies with or is dependent upon the current which flows to a load (not shown) connected across the winding 30 at the terminals L1 and L2. Since the current through the distributed capacitance C varies with or is dependent upon the current which flows to a load connected across the winding 30 at the terminals L1 and L2, the capacitance C is effectively connected in series with the first winding 20, the series circuit being connected between the terminals 102 and 114 to a first alternating current circuit or source (not shown).

The effective value of the capacitance C provided between the adjacent turns of the first and second winding sections 20A and 20B varies with several important factors. First, the capacitance C varies with the effective areas of the turns of the layers of conducting material 86 and 88 included in the first and second winding sections 20A and 20B considered as electrodes. The capacitance C also varies with the dielectric constant, the thickness, and the effective areas of the layers of insulating sheet material 87 and 89 included with the first and second winding sections 20A and 20B, considered as dielectric materials. Since a number of turns included in the first or high voltage winding 20 is normally much greater than the number of turns included in the second or low voltage winding 30 the required value of capacitance C can be much more easily obtained than for the same value of capacitance provided between adjacent turns of the first and second windings 20 and 30, respectively. The required capacitance can be obtained by simply varying the number of turns included in the first winding section 20A and thereby varying the effective length and area of the insulating sheet material which is common to the turns of the first and second winding sections 20A and 20B, respectively, of the first or high voltage winding 20.

In general, the operation of the transformer 10, the capacitance C provided between the adjacent turns of the first and second winding sections 20A and 20B can be constructed to compensate for at least a portion of the voltage drop across the overall impedance of said transformer and even to compensate for a portion of the voltage drop in an associated feeder line connected between the transformer and a load. More specifically, the compensating effect of the capacitance C as a reactance varies with the square of the potential applied across the insulation between the first and second winding sections 20A and 20B considered as a dielectric material. It is important to note that when the turns of the first and second winding sections 20A and 20B are continuously interleaved as shown in FIG. 1, the potential difference or stress across the insulation or dielectric material between adjacent turns of said winding section is substantially uniform. In order to protect the capacitance C against overvoltage caused by an excessive amount of current flowing through the capacitance during fault condition, a protective device PD is connected across the capacitance C as shown in FIG. 2. The protective device PD comprises resistors R0, R1, R2 and R3 which are connected in series circuit relation across the capacitance C, two trinistor switches or silicon controlled rectifier TS and two Zener diodes ZD. The trinistor switches TS are oppositely poled and are connected across the series connected resistors R2, R1 and R3. One Zener diode is connected between one of the trinistors TS and the junction point between the resistors R2 and R1. The other Zener diode is connected between the other trinistor TS and the junction point between the resistors R1 and R3.

Under normal loading conditions, the current flowing in the line and through capacitor C is such that the voltage developed across C, when attenuated by the resistor network R0, R1, R2 and R3 is less than the knee or breakdown voltage of the Zener diodes. Thus, the trinistors or silicon controlled rectifiers TS are non-conducting and the full amount of resistance of the series connected resistors R0, R1, R2 and R3 is in the circuit connected across the capacitor C.

At a predetermined amount of current in C the value of the voltage across C will exceed the Zener knee voltage and current will flow into the trinistor gate which will be fired, thereby becoming conductive. This will occur on each half cycle, both positive and negative, and, after firing, the voltage across C will fall to a value determined by the magnitude of the line current and the value of R0. R0 is used to limit the instantaneous current through the trinistor which would otherwise flow from C in the closed loop. The value of voltage at which the protective device will fire can be readily preset by changing the values of the resistors R1, R2, and R3. However, R2 and R3 should be kept of equal value for reasons of symmetry during both half cycles. It is the voltage drop across the resistor R2 which causes one of the Zener diodes to break down and fire one of the silicon controlled rectifiers and it is the voltage drop across the resistor R3 which causes the other Zener diode to fire the other silicon controlled rectifier. During a test of the protective device the resistance values utilized were as follows: R0 was 1 ohm, R1 was 5,000 ohms and R2 and R3 were each approximately 80 ohms. As explained hereinbefore, the values of the resistors R1, R2 and R3 may be changed to change the operating characteristics of the protective device. The trinistor or silicon controlled rectifiers and the Zener diode are available commercially. As previously stated, the present protective device for switching circuit proves satisfactory when utilized with a 2.5 kv. line voltage and a 10 kva. transformer having a short circuit applied on the second winding. Under these conditions the capacitor voltage was safely limited to 500 volts and the protective circuit was undamaged.

As shown in FIG. 3, the protective device PD may be also utilized to protect a capacitor C which is in series with the high voltage winding of a transformer and is disposed externally of the transformer. In this case the transformer may be of the usual type having a primary winding 209 and a secondary winding 300. Terminals 202 and 214 may be connected to an alternating current source and the terminals L1 and L2 may be connected to a load circuit. A protective device PD functions in the manner hereinbefore described to protect the capacitor C against overvoltage caused by fault current conditions.

The present self-contained protective device may be utilized for other applications, one of which is the limiting of high voltages which occur on open-circuited, unused, top end portions of transformer windings having numerous taps thereon.

The protective device functions as a fast acting by-pass switch to provide a shunt circuit around apparatus which might otherwise be damaged by overvoltage developed in the apparatus. The static device is simple in structure and operation and may be economically manufactured and installed.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A static device for protecting electrical apparatus against overvoltage, said device comprising a plurality of series connected resistors connected to provide a single path electrical circuit in parallel-circuit relation to said apparatus, oppositely poled semiconductor devices connected across said resistors, said semiconductor devices being non-conductive during normal conditions on the apparatus, and said semiconductor devices being responsive to the voltage across said apparatus to become conductive and establish a shunt circuit through said devices around the apparatus.

2. A static device for protecting electrical apparatus against overvoltage, said device comprising a plurality of series connected resistors connected to provide a single path electrical circuit in parallel-circuit relation to said apparatus, oppositely poled semiconductor devices connected across said resistors, said semiconductor devices being non-conductive during normal conditions on the apparatus, and additional semiconductor devices responsive to the voltage across said apparatus to cause the first semiconductor devices to become conductive and establish a shunt circuit through said devices around the apparatus.

3. A static device for protecting electrical apparatus against overvoltage, said device comprising a plurality of series connected resistors connected to provide a single path electrical circuit in parallel-circuit relation to said apparatus, oppositely poled semiconductor devices connected across said resistors, said semiconductor devices being non-conductive during normal conditions on the apparatus, and additional semiconductor devices having a predetermined breakdown voltage characteristic connected across certain of said resistors to cause the first semiconductor devices to become conductive and establish a shunt circuit through said devices around the apparatus.

4. A static device for protecting electrical apparatus against overvoltage, said device comprising a plurality of series connected resistors connected to provide a single path electrical circuit in parallel-circuit relation to said apparatus, oppositely poled semiconductor devices connected across said resistors, said semiconductor devices being non-conductive during normal conditions on the apparatus, additional semiconductor devices having a predetermined breakdown voltage characteristic connected across certain of said resistors to cause the first semiconductor devices to become conductive and establish a shunt circuit through said devices around the apparatus, and an additional resistor connected in said shunt circuit.

5. A static device for protecting electrical apparatus against overvoltage, said device comprising a plurality of series connected resistors connected to provide a single path electrical circuit in parallel-circuit relation to said apparatus, oppositely poled silicon controlled rectifiers connected across said resistors, and Zener diodes connected in circuit relation with the resistors and the rectifiers to cause the rectifiers to become conductive under predetermined voltage conditions and establish a shunt circuit through said rectifiers around the apparatus.

6. A static device for protecting electrical apparatus against overvoltage, said device comprising a plurality of series connected resistors connected to provide a single path shunt circuit in parallel-circuit relation to said apparatus, a pair of oppositely poled silicon controlled rectifiers connected across said resistors, a Zener diode connected between each one of said rectifiers and a junction between two of said resistors, and said Zener diodes firing said rectifiers under predetermined voltage conditions to make the rectifiers conductive and establish an additional shunt circuit around the apparatus.

7. A static switching circuit for by-passing a capacitance comprising a plurality of resistors connected to provide a single path shunt circuit across the capacitance, semiconductor switching devices connected across the resistors, said switching devices being non-conductive during normal loading conditions on the capacitance, and said switching devices being responsive to the voltage across the capacitance to become conductive and short circuit the resistors to establish an additional shunt circuit around the capacitance during fault current conditions on the capacitance.

8. A static switching circuit for by-passing a capacitance comprising a plurality of resistors connected to provide a single path shunt circuit across the capacitance, semiconductor switching devices connected across the resistors, said switching devices being non-conductive during normal loading conditions on the capacitance, and additional semiconductor devices responsive to the voltage across the capacitance to cause the switching devices to become conductive and short circuit the resistors to establish an additional shunt circuit around the capacitance during fault current conditions on the capacitance.

9. A static switching circuit for by-passing a capacitance comprising a plurality of resistors connected to provide a single path shunt circuit across the capacitance, semiconductor switching devices connected across the resistors, said switching devices being non-conductive during normal loading conditions on the capacitance, and additional semiconductor devices having a predetermined breakdown voltage characteristic connected across certain of said resistors to cause the switching devices to become conductive and short circuit the resistors to establish an additional shunt circuit around the capacitance during fault current conditions on the capacitance.

10. A static switching circuit for by-passing a capacitance comprising a plurality of resistors connected to provide a single path shunt circuit across the capacitance, semiconductor switching devices connected across the resistors, said switching devices being non-conductive during normal loading conditions on the capacitance, additional semiconductor devices having a predetermined breakdown voltage characteristic connected across certain of said resistors to cause the switching devices to become conductive and short circuit the resistors to establish an additional shunt circuit around the capacitance during fault current conditions on the capacitance, and an additional resistor connected in said shunt circuit.

11. In combination, a first circuit adapted to be energized with an alternating current voltage, capacitance in series circuit relationship with said first circuit, a second circuit connected to said first circuit and providing a single path electrical circuit in shunt relationship to said capacitance, said second circuit comprising at least two resistors of substantially equal value, a first semiconductor device having a control electrode and two additional electrodes, said control electrode being connected to one side of a first Zener diode, the other side of said first Zener diode being connected across a first one of said two resistors, the other two electrodes of said first semiconductor device being connected in circuit relationship to provide a third circuit in shunt relationship to said capacitance, said first Zener dode being responsive to the voltage across said capacitance when said voltage reaches a predetermined value to cause said first semiconductor device to conduct on one-half cycle of the alternating current voltage and effectively connect said third circuit across said capacitance, a second semiconductor device having a control electrode and two additional electrodes, said control electrode being connected to one side of a second Zener diode, the other side of said second Zener diode being connected across a second one of the said two resistors, the other two electrodes of said second semiconductor device being connected in circuit relationship to provide a fourth circuit in shunt relationship to said capacitance, said second Zener diode being responsive to the voltage across said capacitance when said voltage reaches a predetermined value to cause said second semiconductor device to conduct on another half cycle of the alternating current voltage and effectively connect said fourth circuit across said capacitance.

References Cited by the Examiner

UNITED STATES PATENTS

| | | | |
|---|---|---|---|
| 2,207,577 | 7/1940 | Buell | 317—12.1 |
| 2,356,589 | 8/1944 | Hessenberg | 317—12.1 |
| 2,963,637 | 12/1960 | Osborn | 317—16 X |
| 3,022,454 | 2/1962 | Millis | 317—148.5 X |
| 3,187,224 | 6/1965 | Massena | 317—16 |
| 3,213,349 | 10/1965 | Gutzwiller | 317—43 X |

SAMUEL BERNSTEIN, *Primary Examiner.*

R. V. LUPO, *Assistant Examiner.*